(12) United States Patent
Zwicky et al.

(10) Patent No.: US 8,552,317 B2
(45) Date of Patent: Oct. 8, 2013

(54) METAL-ENCAPSULATED, POLYPHASE, GAS-INSULATED BUSBAR SWITCH DISCONNECTOR AND EARTHING SWITCH

(75) Inventors: Daniel Zwicky, Niederrohrdorf (CH); David Saxl, Zurich (CH); Michael Mann, Alzenau (DE); Daniel Kuhl, Frankfurt (DE); Florian Brandl, Zurich (CH)

(73) Assignee: ABB Technology AG, Zürich (CH)

( * ) Notice: Subject to any disclaimer, the term of this patent is extended or adjusted under 35 U.S.C. 154(b) by 63 days.

(21) Appl. No.: 13/297,973

(22) Filed: Nov. 16, 2011

(65) Prior Publication Data
US 2012/0120560 A1    May 17, 2012

Related U.S. Application Data

(63) Continuation of application No. PCT/EP2010/056155, filed on May 6, 2010.

(30) Foreign Application Priority Data

May 20, 2009   (DE) .......................... 10 2009 022 105
Jan. 18, 2010   (EP) .................................... 10000406

(51) Int. Cl.
*H01H 31/02*    (2006.01)
(52) U.S. Cl.
USPC ...................................................... 200/48 R
(58) Field of Classification Search
USPC .............. 200/48 R, 148 R, 163, 50.32, 50.33; 218/78–79, 67, 45; 361/624, 341, 335
See application file for complete search history.

(56) References Cited

U.S. PATENT DOCUMENTS

| | | | |
|---|---|---|---|
| 3,665,135 A | 5/1972 | Boersma et al. | |
| 3,886,336 A | 5/1975 | Boersma et al. | |

(Continued)

FOREIGN PATENT DOCUMENTS

| | | |
|---|---|---|
| DE | 24 14 200 A1 | 10/1975 |
| EP | 0 678 952 A1 | 10/1995 |

(Continued)

OTHER PUBLICATIONS

International Search Report (PCT/ISA/210) issued on Jul. 5, 2010, by European Patent Office as the International Searching Authority for International Application No. PCT/EP2010/056155.
European Search Report issued on May 18, 2010 for EP 10 00 0406 (with English language translation of category of cited documents).

*Primary Examiner* — Edwin A. Leon
(74) *Attorney, Agent, or Firm* — Buchanan Ingersoll & Rooney PC

(57) ABSTRACT

Exemplary embodiments are directed to a metal-encapsulated, polyphase busbar switch disconnector and earthing switch, including a housing which, on each of opposite sides has three flanges that lie on a plane. Each flange being connected to one busbar and, on a third side, a flange is connected to a circuit breaker. The circuit breaker having conductor elements arranged in an interior of the housing. First conductor elements are connected to the busbars, and second conductor elements are connected to circuit breaker poles. The second conductor elements are aligned at right angles to the first conductor elements, which connect the busbars to one another, such that the first conductor elements are substantially U-shaped and are passed around the second conductor elements. A switch disconnector and earthing switch contact arrangement is provided between an inner housing wall and the first and second conductor elements.

14 Claims, 4 Drawing Sheets

(56) References Cited

U.S. PATENT DOCUMENTS

| | | |
|---|---|---|
| 4,644,442 A | 2/1987 | Ponsioen et al. |
| 5,578,804 A * | 11/1996 | Berger et al. ............ 218/43 |
| 5,625,179 A | 4/1997 | Bleiker et al. |
| 5,828,025 A | 10/1998 | Neumaier et al. |
| 6,111,745 A * | 8/2000 | Wilkie et al. ............ 361/605 |
| 7,989,717 B2 * | 8/2011 | Jung ............ 200/48 R |
| 8,339,773 B2 * | 12/2012 | Frassineti et al. ............ 361/677 |
| 2008/0049383 A1 * | 2/2008 | Fukunaga et al. ............ 361/612 |

FOREIGN PATENT DOCUMENTS

| | | |
|---|---|---|
| EP | 0 824 264 A2 | 2/1998 |
| EP | 2 091 057 A1 | 8/2009 |
| JP | 2000-134733 A | 5/2000 |
| JP | 2004-120974 A | 4/2004 |
| JP | 2004-320883 A | 11/2004 |

* cited by examiner

METAL-ENCAPSULATED, POLYPHASE, GAS-INSULATED BUSBAR SWITCH DISCONNECTOR AND EARTHING SWITCH

RELATED APPLICATION(S)

This application claims priority as a continuation application under 35 U.S.C. §120 to PCT/EP2010/056155, which was filed as an International Application on May 6, 2010 designating the U.S., and which claims priority to EP Application 10000406.8 filed in Europe on Jan. 18, 2010 and DE Application 102009022105.0 filed in Germany on May 20, 2009. The entire contents of these applications are hereby incorporated by reference in their entireties.

FIELD

The disclosure relates to a switch, such as a busbar switch disconnector and earthing switch.

BACKGROUND INFORMATION

A combined switch disconnector and earthing switch for a metal-encapsulated, gas-insulated high-voltage switchgear assembly is disclosed in EP 0 824 246 B1. The contact bolt for each phase is mounted so that it can move in a housing element, with the movement lines of the contact bolts running parallel. The contact bolt is driven via a drive spindle which is in the form of a pinion rod and engages with a toothed rod section on the contact bolt. The movement lines of the contact bolts run, for example, at an angle of about 40° to the connecting conductors between two flanges.

DE 24 14 200 A1 discloses a metal-encapsulated switchgear assembly in which a contact bolt can move in a reciprocating manner within a supporting housing, wherein the contact bolt is connected to an active part in one position, and to an earthing contact in a second position. The contact bolt is driven via a spindle which runs parallel to the contact bolt, can rotate and has an external thread. An arm which surrounds a through-hole with an internal thread is fitted to the contact bolt, at right angles thereto, and the spindle which can rotate passes through it, with the threaded rod being driven by an insulator, which is aligned with it, by being caused to rotate via a bevel gear transmission from the longitudinal side of the combined switch disconnector and earthing switch. This switchgear assembly is a single-phase-encapsulated switchgear assembly.

U.S. Pat. No. 3,665,135 discloses a similar design of a switchgear assembly as DE 24 14 200 A1.

EP 0 678 952 A1 describes a combined switch disconnector and earthing switch, although these two devices are operated separately from one another.

SUMMARY

An exemplary metal-encapsulated, polyphase busbar switch disconnector and earthing switch is disclosed, comprising: a housing which, on each of opposite sides, has three flanges, which lie on a plane, each for connection to one busbar and, on a third side, has a flange for connection to a circuit breaker, having conductor elements which are arranged in the interior of the housing, first conductor elements of which are connected to the busbars, and second conductor elements are connected to, circuit breaker poles, wherein the second conductor elements are aligned at right angles to the first conductor elements, which connect the busbars to one another, in that the first conductor elements are substantially U shaped and are passed around the second conductor elements, and wherein a switch disconnector and earthing switch contact arrangement is provided between an inner housing wall and the first and second conductor elements.

An exemplary metal-encapsulated, polyphase busbar switch disconnector and earthing switch is disclosed, comprising: a housing that comprises: first flanges on first and second sides of the housing, wherein each flange lies on a plane for connecting to a busbar; a second flange on a third side of the housing for connecting to a circuit breaker; conductor elements which are arranged in an interior of the housing, wherein first conductor elements are connected to the busbars, and second conductor elements are connected to circuit breaker poles; and a switch disconnector and earthing switch contact arrangement between an inner housing wall and the first and second conductor elements, wherein the second conductor elements are aligned at right angles to the first conductor elements, in that the first conductor elements are substantially U shaped and partially surround the second conductor elements.

BRIEF DESCRIPTION OF THE DRAWINGS

The exemplary embodiments, as well as further advantageous refinements and improvements, and further advantages of the exemplary embodiment, will be explained and described in more detail with reference to the drawings, which illustrate exemplary embodiments of an arrangement in accordance with the present disclosure, and in which.

DETAILED DESCRIPTION

Figure 1:
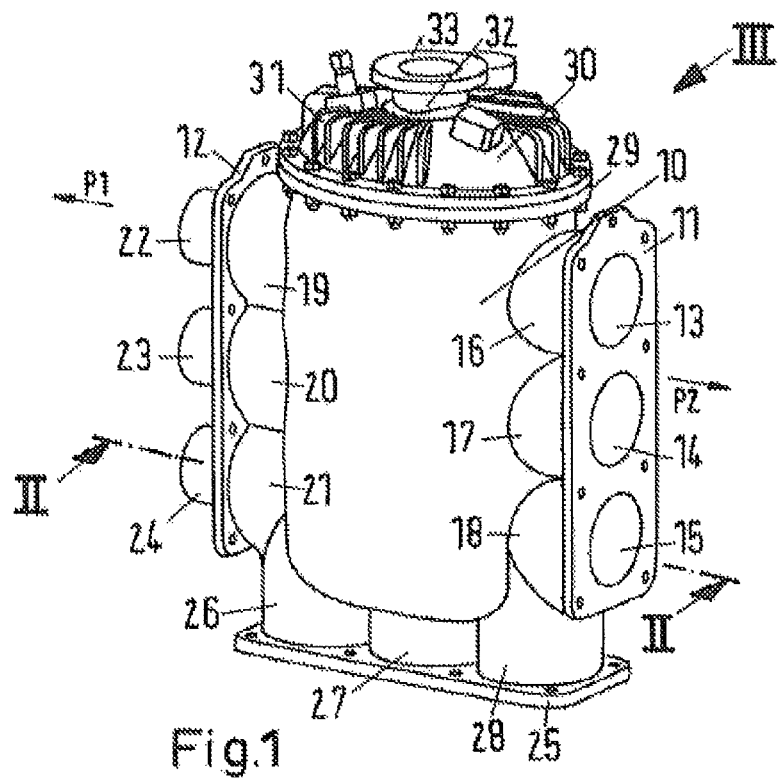
FIG. 1 shows a perspective view of a housing with a combined switch disconnector and earthing switch in accordance with an exemplary embodiment of the present disclosure.

Exemplary embodiments of the present disclosure provide a busbar switch disconnector of the type mentioned initially, which is of simple design and occupies little space.

In an exemplary embodiment of the present disclosure, the second conductor elements, which are connected to the circuit breaker poles, are aligned at right angles to the first conductor elements, which connect the busbars to one another, wherein the first conductor elements are approximately U shaped and are passed around the second conductor elements; a switch disconnector and earthing switch contact arrangement is provided for each phase between one of the housing inner walls and the first and second conductor elements.

In another exemplary embodiment of the present disclosure, the switch disconnector and earthing switching elements are in the form of linear-action disconnectors, wherein the movement lines of the linear-action contact pieces lie on a plane which runs at right angles to the plane which is spanned by the busbars.

In another exemplary embodiment of the present disclosure, the switch disconnector and earthing switching elements can have linear-action contact pieces whose movement lines lie on a plane which runs parallel to the plane which is spanned by the busbars; the movement lines of the linear-action contact pieces run parallel to the busbars.

Because of the advantageous arrangement of the conductor elements within the housing, this housing may be in the form of a hollow body with an oval cross section, whose longer axis is aligned substantially parallel to the line routing of the first conductor elements and of the busbars. This results in a considerable space saving in comparison to a housing with a circular cross section.

The busbars are each connected to the narrow sides or to those sections of the housing which have the smaller internal radius. This likewise minimizes the space specified.

In an exemplary embodiment of the present disclosure this case, the movement line of the moveable switching pin, which is in the form of a linear-action contact bolt, of all the switch disconnector and earthing switching contact arrangements for each phase, runs substantially parallel to the line routing direction of the first conductor elements, and parallel to the profile of the busbars, as well as parallel to the profile of the longer cross-sectional axis of the oval shape, while in contrast, in other exemplary embodiments, the contact bolts of the switch disconnector and earthing switching contact arrangements run at right angles to the plane on which the busbars are arranged, and therefore also at right angles to the profile of the longer cross-sectional axis of the oval shape.

The movement lines of the contact bolts of all the phases in this arrangement lie on a plane, in which the contact bolts can be driven by in each case one insulating spindle, which is aligned with the movement line, with the drive spindle lying on the plane of the movement lines and running at right angles to the insulating spindles, and being coupled to them via a respective direction-changing transmission. The direction-changing transmission for driving the contact bolts is in this case located in the earthing contact pieces.

Figure 3:
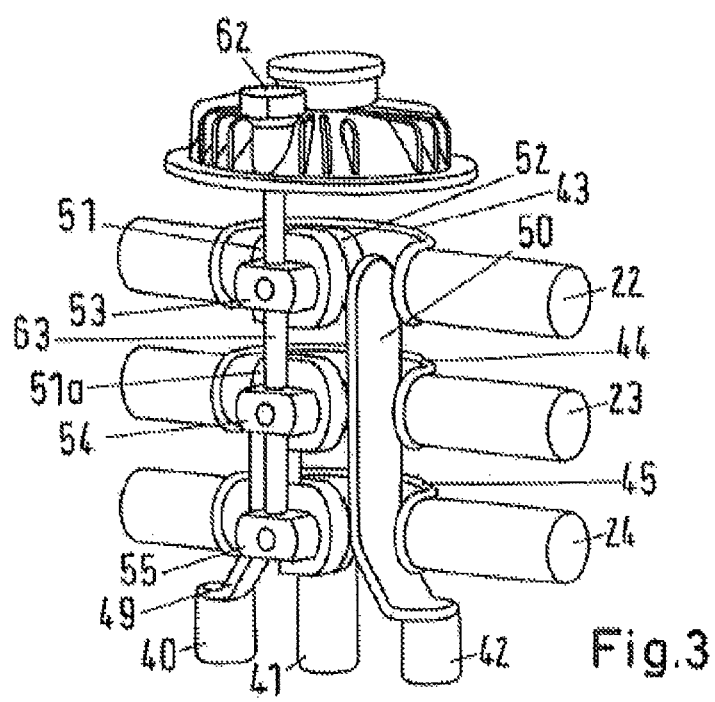
FIG. 3 shows a perspective view along the arrow direction III of FIG. 1 in accordance with an exemplary embodiment of the present disclosure.
Figure 2:
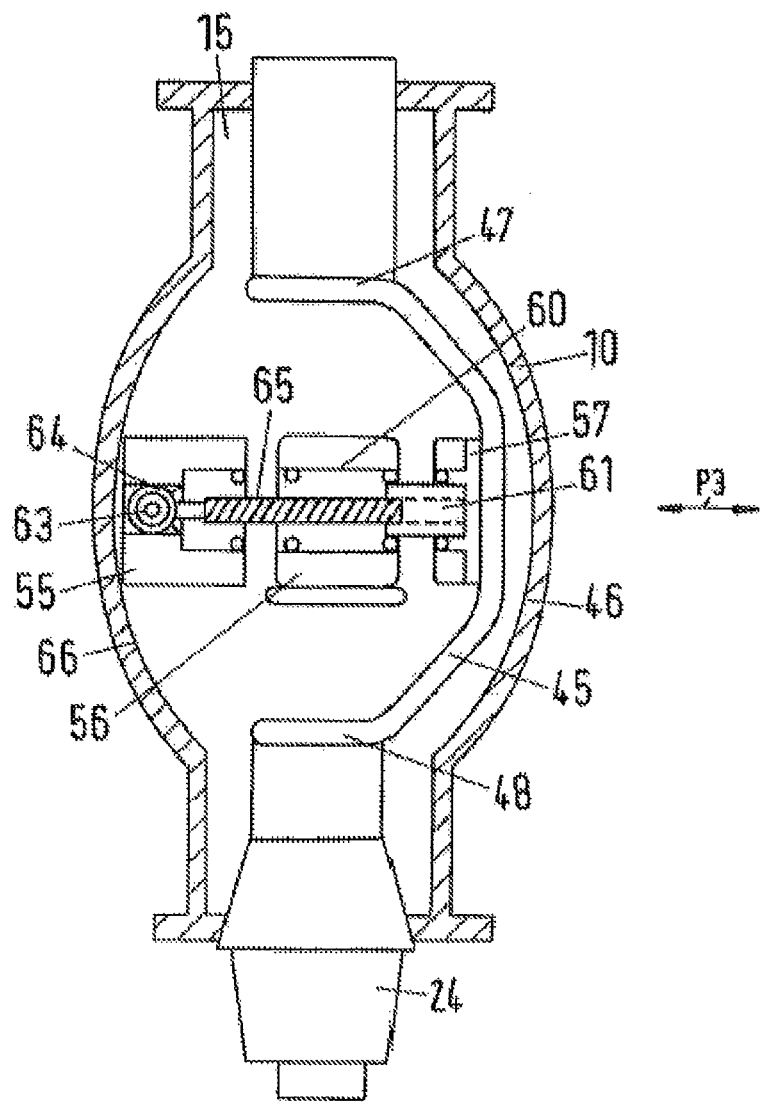
FIG. 2 shows a section view along the section line II-II in FIG. 1, in accordance with an exemplary embodiment of the present disclosure.
Figure 4:
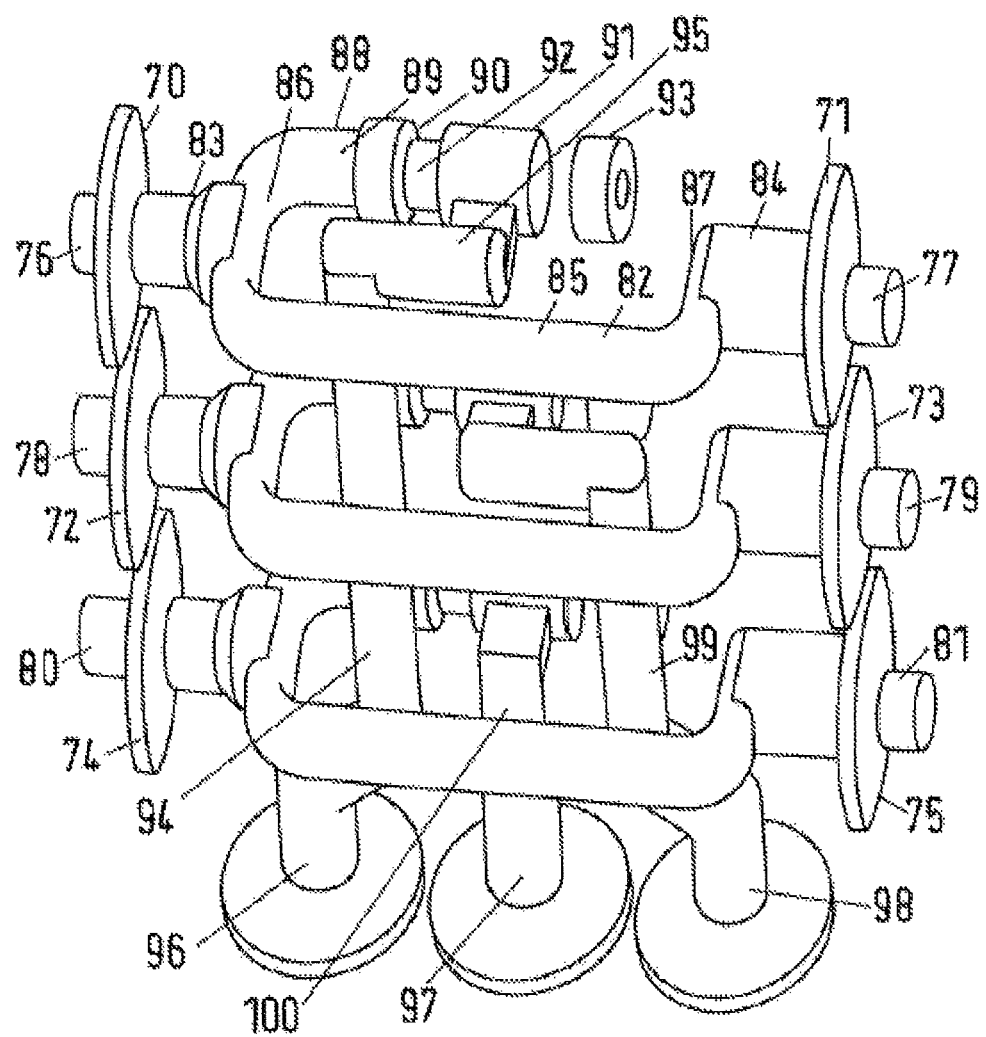
FIG. 4 shows a second perspective view on a front side, which is opposite the view along the arrow direction III of FIG. 1 in accordance with exemplary embodiment of the present disclosure.
Figure 5:
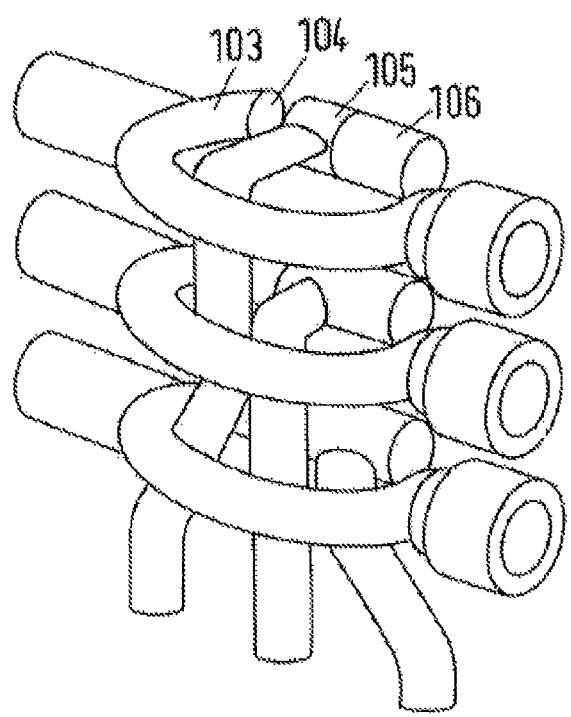
FIG. 5 shows a third perspective view on a front side, which is opposite the view along the arrow direction III of FIG. 1 in accordance with an exemplary embodiment of the present disclosure.

It should be understood that the fittings shown in FIGS. 3, 4 and 5 are inserted into the housing, which is illustrated in the form of a section in FIG. 1 and in FIG. 2.

FIG. 1 shows a perspective view of a housing with a combined switch disconnector and earthing switch in accordance with an exemplary embodiment of the present disclosure. As shown in FIG. 1, a housing 10 has an oval shape with opposite envelope lines in the housing area with a smaller internal radius, a first flange 11 and a second flange 12, which surround openings 13, 14 and 15. Three connecting stubs 16, 17 and 18 are connected to the housing 10 and open into the respective openings 13, 14 and 15. Connecting stubs 19, 20, 21 are provided on the opposite side of the housing 10, run parallel to the connecting stubs 16, 17 and 18 and are surrounded by the flange 12, with the flange 12 also having openings, in the same way as the openings 13, 14 and 15 which, covered thereby, cannot be seen. A respective busbar bushing 22, 23 and 24 is inserted into the openings of the flange 12. The busbar bushings 22, 23, 24 are also inserted into the respective openings 13, 14, and 15 (not shown).

The connecting stubs 16, 17 and 18 as well as 19, 20 and 21 are each connected to the area or to the envelope line of the housing 10 on which the smaller internal radius of the oval shape of the housing is located. The connecting stubs 16, 17 and 18 as well as 19, 20, 21 are located vertically one above the other.

A third flange 25 is provided at right angles to the flanges 11 and 12 and surrounds further connecting stubs 26, 27 and 28 in which supply lines run to the circuit breaker poles of a circuit breaker, which is not illustrated in any more detail in the drawing. The opposite end of the housing 10 to the flange 25 has a fourth flange 29 which is matched to the oval shape of the housing 29 and is closed by means of a cover 30, on which a number of cooling ribs 31 are integrally formed. In this case, the cover 30 is in the form of a shroud and, in the area of its center axis, has a further connecting stub 32 with a flange 33 to which, for example, a viewing window or the like could be connected.

FIG. 3 shows a perspective view along the arrow direction III of FIG. 1 in accordance with an exemplary embodiment of the present disclosure. The illustration shown in FIG. 3 of the fittings which can be inserted into the housing is a view along the arrow direction III in FIG. 1, that is to say a view from the rear. The fittings include connecting elements 40, 41 and 42, which lead to the circuit breaker poles, with the connecting element 42 passing through the connecting stub 26, and the connecting element 40 passing through the connecting stub 28. The connecting element 41 passes through the connecting stub 27. FIG. 3 shows the three bushings 22, 23 and 24 which are connected to first conductor elements 43, 44 and 45, which are U-shaped, as can be seen in FIG. 2.

FIG. 2 shows a section view along the section line II-II in FIG. 1, in accordance with an exemplary embodiment of the present disclosure. As shown in FIG. 2, the conductor sub-element 45 is shown in the form of a section along the section line II-II in FIG. 1, with the outside of the U-shape corresponding approximately to a first inner surface 46 of the housing 10, which is the inner surface 46 which is located in the area of the larger radius of the oval shape, and extending as close as possible to this first inner surface 46, along it, guaranteeing the isolation separations. The two limbs 47 and 48 which run parallel to one another are connected via the bushings 24 and, also via the bushings 22 and 23 to the corresponding busbar connections which, in FIG. 1, can be considered to continue further in the direction of the arrows P1 and P2.

FIG. 2 is a representative illustration of the housing 10 in which the oval shape of the housing may not be clearly defined. It should be understood, however, that an axis which is aligned with the center axes of the opening 15 and the bushing 24 should be considered to be larger than the axis which runs transversely with respect thereto.

Second conductor elements 49 and 50 are connected to the connecting elements 40, 41 and 42, although FIG. 3 does not show the connector element which connects the connecting element 41 to the busbar which leads to the bushing 23.

The second conductor element 50, which is connected to the connecting conductor 42 of the circuit breaker, runs parallel to the longitudinal axis of the housing, which runs through the center of the oval shape and at right angles to the plane of the housing 10 which is spanned by the flanges 25 and 29, and extends as far as the busbars, which are passed through the openings 13 and/or through the connecting stubs 22. The active part 51 of a switch disconnector and earthing switch is connected to the free end of the second conductor element 50 and is associated with a second active part 52, which is electrically conductively connected to the first conductor element 43. The two active parts are associated with an earthing contact piece 53, to which an earthing contact piece 54 and 55 corresponds, with the latter being illustrated in the form of a section view in FIG. 2.

The first active part 56, which belongs to the earthing contact piece 55, has the reference number 57 in FIG. 2; the second active part has the reference number 56 in the drawing in FIG. 2; in a corresponding manner, the first and second active parts 51 and 52, and/or 51a, are associated in a corresponding manner with the earthing contact pieces 52 and 53, respectively; the associated second active part is covered by the conductor element 50.

The three switch disconnector and earthing switches are arranged vertically one above the other.

As shown in FIG. 2, an inner hole 60, in which a linear-action contact piece 61 is mounted such that it can move in the direction of the double-headed arrow P3 is located in the first active part 56. This linear-action contact piece 61 can be connected on the one hand to the second active part 57 and therefore via the conductor element 45 to the busbars, and on the other hand it can also be connected to the earthing contact piece 55, with this being done via a drive device 62 which causes a drive spindle 63 to rotate, which drive spindle 63 passes through the earthing contact pieces 53, 54 and 55, where it is in each case connected to a direction-changing transmission 64, which operates an insulating spindle 65. The insulating spindles 65, which all have three switch disconnectors and earthing switches, are in the form of a threaded spindle which engages in the interior of the linear-action contact piece 61, and connect the first active part 56 to the second active part 57 during rotation, such that the associated busbar is connected to the associated pole of the circuit breaker. In the process, during rotation of the insulating spindle 65, the linear-action contact piece 61 is impeded in its rotation, and this can be achieved in various ways. The essential feature is that the linear-action contact piece 61 moves linearly during rotation of the insulating spindle 65. When the drive device is rotated in the opposite direction, then the linear-action contact piece 61 connects the earthing contact piece 55 to the active part 56.

In the same way as the earthing contact piece 53 and 54, the earthing contact piece 55 is attached to the inner surface 66 of the housing 10, opposite the inner surface 46.

As shown in FIG. 2, the switch disconnector and earthing switch arrangements are arranged between the conductor element 45, which is matched to the inner surface 46, and the opposite housing inner wall 66. This allows the housing 10 to have a narrow width, as a result of which the housing 10 can assume an oval shape.

FIG. 4 shows a second perspective view on a front side, which is opposite the view along the arrow direction III of FIG. 1 in accordance with exemplary embodiment of the present disclosure. FIG. 4 shows the fittings into the interior of the housing 10 with mutually opposite parallel running insulators, from which connecting stubs 76, 77; 78, 79; 80, 81 which can be connected to the busbars project. The insulators can be in the form of post insulators or bulkhead insulators. The exemplary embodiment illustrated in FIG. 4, shows bulkhead insulators. A respective first conductor element arrangement is provided between the bulkhead insulators 70, 71, the bulkhead insulators 72 and 73, and the bulkhead insulators 74 and 75, with only the first conductor element 82, which is located between the two bulkhead insulators 70 and 71, being considered in more detail. In this case, the first conductor element 82 is connected to connecting pieces 83 and 84, with the first conductor element 82 being U-shaped with a central area 85 and having two limbs 86 and 87, which are connected to the connecting pieces 83 and 84. The limb 86 projects beyond the connecting piece 83 into an L-shaped projection 88, to whose limb 89, which runs parallel to the web 85, a first active part 90 is attached. The first active pact 90 is associated with a second active part 91 in which a linear-action contact piece 92 slides, with the center axis of the linear-action contact piece 92 and its movement line lying on the plane which is spanned by the U-shape of the second conductor element 82. The movement line of the linear-action contact piece 92 accordingly runs parallel to the connecting line between the connecting pieces 76/83 and 77/84.

An earthing contact piece 93 is also provided, to which the linear-action contact piece 92 can be connected.

The first active part 91 is connected to a second conductor element 94 via an intermediate support 95, which second conductor element 94 runs at right angles to the plane which runs through the U-shape of the first conductor element 82, with the second conductor element 94 being located between the web 85 and the limb 89.

The conductor elements (without reference numbers) located between the connecting pieces 78 and 79 as well as 80 and 81 are designed in the same manner as the first conductor element 82 with the two active parts 90 and 91 and the linear-action contact piece 92, as well as with the earthing switching contact piece 93, and will be described in further detail. The connection of the first active part to the circuit breaker poles is different from the arrangement relating to the switch disconnector and earthing switch between the two connecting pieces 76 and 77. Instead of a second conductor element 94 which is bent in an L-shape and is passed through with a connecting contact piece 96 to the circuit breaker, the second conductor elements for the other connecting contact pieces 97 and 98 to the circuit breaker poles are designed to be shorter, with the conductor element 99 connecting the first active part of the switch disconnector and earthing switch between the connecting pieces 78 and 79, and the conductor element 100 connecting the first active part of the switch disconnector and earthing switch between the two connecting pieces 80 and 81.

In the embodiment shown in FIG. 3, the connecting pieces 96, 97 and 98 correspond to the connecting pieces 40, 41 and 42.

FIG. 5 shows a third perspective view on a front side, which is opposite the view along the arrow direction III of FIG. 1 in accordance with an exemplary embodiment of the present disclosure. As shown in FIG. 5, the conductor elements 101, which correspond to the conductor elements 82, have a round-oval shape, with the oval shape continuing beyond the connecting piece 102 and being fitted at the free end of this projection 103 with the first active part 104 of the switch disconnector and earthing switch, with which a second active part 105 and an earthing contact piece 106 are associated.

As shown in FIG. 3, the movement lines of the linear-action contact pieces 61 are located vertically one above the other and on a plane which lies parallel to or passes through the center axis of the oval shape of the housing. The insulating rods accordingly run at right angles to the central area of the conductor elements 45 while, in contrast, in the exemplary embodiments shown in FIGS. 4 and 5, the movement lines of the linear-action contact pieces lie on a plane which runs parallel to the plane on which the connecting lines of the busbars run within the housing. It could also be said that the movement lines in the exemplary embodiments shown in FIGS. 4 and 5 run at right angles to the movement lines of the exemplary embodiment shown in FIG. 3, which represents a different embodiment of the disclosure.

In the exemplary embodiment shown in FIG. 3, the second conductor elements 49 and 50, which are connected to the circuit breakers, are in the form of ribbon conductors, in the same way as the first conductor elements. This ribbon conductor arrangement has the advantage that, on the one hand, the resistance, and on the other hand, the so-called characteristic impedance, are reduced in comparison to round conductors. Furthermore, heat dissipation by natural convection in the interior of the housing along the ribbon conductor elements is improved, thus increasing the heat dissipation. Heat can then additionally be dissipated via the cooling ribs 31 which are located in the cover 30.

In the exemplary embodiments shown in FIGS. 4 and 5, the conductor elements 82 have an oval cross section and can be produced either from semi-finished products or cast elements, which, because of the oval shape, likewise leads to an improvement in the heat dissipation in comparison to round conductors and, furthermore, has a lower resistance than round conductors.

It should also be added that, for the same reason as that for which the second conductor elements 50, 49 are ribbon conductors, the exemplary conductor elements 45 shown in FIG. 2 are also ribbon conductors and, in the exemplary embodiment shown in FIGS. 4 and 5, the corresponding conductor elements are oval, as mentioned.

The exemplary embodiments has been described with reference to a three-phase switch, however, it should be understood that the disclosed embodiments can also be applicable to two-phase switches.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A metal-encapsulated, polyphase busbar switch disconnector and earthing switch assembly, comprising:
   a housing that comprises:
      on each of opposite sides, three flanges that lie on respective planes for connection to respective busbars; and,
      on a third side, a flange for connection to a circuit breaker, the flange having conductor elements which are arranged in the interior of the housing, first conductor elements of which are connected to the busbars, and second conductor elements are connected to circuit breaker poles,
   wherein the second conductor elements are aligned at right angles to the first conductor elements, which connect the busbars to one another, the first conductor elements being substantially U shaped and passed around the second conductor elements, and
   wherein a switch disconnector and earthing switch contact arrangement is provided between an inner housing wall and the first and second conductor elements.

2. The switch disconnector and earthing switch according to claim 1, wherein the switch disconnector and earthing switching elements are linear-action disconnectors, and wherein movement lines of the linear-action contact pieces lie on a plane which runs at right angles to the plane which is spanned by the busbars.

3. The switch disconnector and earthing switch according to claim 1, wherein the switch disconnector and earthing switching elements have linear-action contact pieces whose movement lines lie on a plane which runs parallel to a plane which is spanned by the busbars.

4. The switch disconnector and earthing switch according to claim 1, wherein the housing is in the form of a hollow body with an oval cross section, whose longer axis is aligned approximately parallel to the line routing of the first conductor elements and of the busbars.

5. The switch disconnector and earthing switch according to claim 4, wherein the busbars are each connected on narrow sides or to a section of the housing having a smaller internal radius.

6. The switch disconnector and earthing switch according to claim 4, wherein the first conductor elements are routed close to the first inner surface of the housing, which has a larger radius of the oval shape.

7. The switch disconnector and earthing switch according claim 6, wherein the switch disconnector and earthing switching elements are arranged between associated first conductor elements and wherein a second housing inner surface which is opposite the first housing inner surface has a larger internal radius.

8. A metal-encapsulated, polyphase busbar switch disconnector and earthing switch assembly, comprising:
   a housing that comprises:
      first flanges on first and second sides of the housing, wherein each flange lies on a plane for connecting to a busbar;
      a second flange on a third side of the housing for connecting to a circuit breaker;
      conductor elements which are arranged in an interior of the housing, wherein first conductor elements are connected to the busbars, and second conductor elements are connected to circuit breaker poles; and
      a switch disconnector and earthing switch contact arrangement between an inner housing wall and the first and second conductor elements,
      wherein the second conductor elements are aligned at right angles to the first conductor elements, the first conductor elements being substantially U shaped and partially surround the second conductor elements.

9. The switch disconnector and earthing switch according to claim 8, wherein the switch disconnector and earthing switching elements are linear-action disconnectors, and wherein movement lines of the linear-action contact pieces lie on a plane perpendicular to a plane spanned by the busbars.

10. The switch disconnector and earthing switch according to claim 8, wherein the switch disconnector and earthing switching elements have linear-action contact pieces whose movement lines lie on a plane parallel to a plane spanned by the busbars.

11. The switch disconnector and earthing switch according to claim 8, wherein the housing is hollow having an oval cross section with a longer axis substantially parallel to a line routing of the first conductor elements and the busbars.

12. The switch disconnector and earthing switch according to claim 11, wherein the each busbar is connected on a narrow side or to a section of the housing having a smaller internal radius than other sections of the housing.

13. The switch disconnector and earthing switch according to claim 11, wherein the first conductor elements are routed close to a first inner surface of the housing, which has a larger radius of the oval shape than other inner surfaces of the housing.

14. The switch disconnector and earthing switch according claim 13, wherein the switch disconnector and earthing switching elements are arranged between associated first conductor elements, and wherein a second housing inner surface which is opposite the first housing inner surface has a larger internal radius.

* * * * *